United States Patent [19]

Mallik et al.

[11] 4,438,017

[45] Mar. 20, 1984

[54] SCINTILLATION LIQUID COMPATIBLE WITH HIGH PERFORMANCE LIQUID CHROMATOGRAPHY SOLVENTS

[75] Inventors: Arjun Mallik, Pequannock; Daniel Koetters, Butler; Harold Edelstein, Fair Lawn, all of N.J.

[73] Assignee: Allied Corporation, Morris Township, Morris County, N.J.

[21] Appl. No.: 425,622

[22] Filed: Sep. 28, 1982

[51] Int. Cl.$^3$ .............................................. C09K 11/06
[52] U.S. Cl. ................................................ 252/301.17
[58] Field of Search ................................... 252/301.17

[56] References Cited

U.S. PATENT DOCUMENTS 3,573,219  3/1971  Benson ........................... 252/301.17
4,124,527  11/1978  Kauffman ....................... 252/301.17

FOREIGN PATENT DOCUMENTS 1428367  3/1976  United Kingdom ........... 252/301.17

*Primary Examiner*—John F. Niebling
*Attorney, Agent, or Firm*—Webb, Burden, Robinson & Webb

[57] ABSTRACT

A liquid scintillation composition especially useful for gradient elution chromatography comprising an aromatic liquid capable of capturing energy from radiation by radio-tagged compositions, at least one fluor, at least one low molecular weight alcohol and a surfactant comprising a polyoxyalkylene unit and a straight chain alkyl unit. Preferably, the surfactant comprises an ethoxylated or propoxylated fatty alcohol or fatty acid in which the moles of ethylene or propylene oxide range from 5 to 25 and the length of the alkyl chain is between 6 and 20 carbon atoms.

4 Claims, No Drawings

SCINTILLATION LIQUID COMPATIBLE WITH HIGH PERFORMANCE LIQUID CHROMATOGRAPHY SOLVENTS

DESCRIPTION

BACKGROUND

In general chemistry, organic chemistry, and biochemistry, mixtures of radio labelled compounds may be separated by traditional liquid chromatography (LC), high performance liquid chromatography (HPLC), or paper chromatography. The constituents of the mixtures are thereby isolated into different fractions. The radioactivity of these fractions can be measured by mixing an aliquot with about two to four times its volume of scintillation liquid (generally referred to as a "scintillation cocktail") and thereafter counting light flashes produced by the radioactivity of the fractions. Thus liquid scintillation counting is known to be useful for measuring the concentration of a radio labelled species in a specimen or fraction.

Liquid chromatography (LC) is an established technique for separation and analysis of multi-component mixtures. A newer technique known as high performance liquid chromatography (HPLC) is preferred for the quantitation of thermally unstable and nonvolatile components. It has been made possible by the development of chemically bonded stationary phases. Solvent programming (i.e., gradient elution) is a common technique with HPLC. In normal bonded phase chromatography, the stationary phase is polar (as defined by the predominant functional group) and the mobile phase (elution solvent) is nonpolar. In this case, the nonpolar species (compounds in the mixture) which prefer the mobile phase exhibit lower retention and elute first. With reversed phase chromatography, the stationary phase is nonpolar and the mobile phase is polar. The solution elution order may be the reverse observed with normal bonded phase chromatography. An example of a solvent gradient for reverse phase chromatography is water mixed with increasing proportions of acetonitrile. The expected elution is in order of increasing hydrophobic character of the hydrocarbons in the specimen. If one or more of the components of the mixture being analyzed by HPLC is radio-tagged and to be quantified by liquid scintillation techniques, a consideration challenge is presented due to the continually changing composition of the solvent. The radioactivity of various fractions is determined by mixing an aliquot with about two to four times its volume of scintillation cocktail. Unfortunately, the counting efficiency may vary substantially as the composition of the solvent in the fraction varies.

Typically, liquid scintillation counting comprises the addition of a specimen or fraction that emits nuclear radiation to an organic liquid mixture which in turn emits light when intercepting the radiation. The flash of light is detected, for example by a photocell which is in a circuit that counts the flashes. The organic liquid comprises an aromatic solvent for capturing the energy of the radiation, primary and secondary fluors (fluorescent compounds) for converting the energy to a light flash and surfactants to enable the intimate admixture of the liquid with the specimen. See U.S. Pat. No. 4,124,527 for general background. An ideal scintillation cocktail would provide a very high degree of efficiency (number of flashes detected per number of radiated particles) over a range of specimen/cocktail mixtures and for a large number of specimen solvent types.

Prior liquid scintillation cocktails known to applicants for use in flow-through cells for measuring radioactivity in fractions from high performance liquid chromatography (HPLC) procedures, for example radiotagged metabolites in pharmaceutical and biomedical research, have had the drawback of working with only certain solvents and then in only certain solvent/water mixtures. Some existing cocktails limit the selection of the HPLC solvents to methanol, isopropyl alcohol (IPA) or similar alcohols and sometimes tetrahydrofuran (THF). Other HPLC solvents such as tetrahydrofuran (THF) or acetonitrile form two phases with certain known cocktails and produce a nonuniform counting efficiency when blended with water in various proportions.

SUMMARY OF THE INVENTION

It is an object of this invention to provide a scintillation cocktail that is compatible with tetrahydrofuran, acetonitrile, isopropyl alcohol and methanol.

It is a further object to provide a scintillation cocktail that has great tolerance of water, say up to 90%, as might be encountered in a gradient elution procedure.

It is yet a further object of this invention to provide a scintillation cocktail that has an almost uniform counting efficiency over a wide range of solvent/water ratios.

It is a yet further object of this invention to provide a scintillation cocktail which when mixed with specimens in tetrahydrofuran, acetonitrile, isopropyl alcohol, or methanol provides a cocktail mixture that is substantially clear and stays fluid making it ideal for flow-through cell counting.

It is a significant advantage according to this invention that the scintillation cocktail described herein has an almost uniform counting efficiency over a wide range of solvents in varying solvent/water ratios, for example 30 to 90% for IPA in water, 30 to 90% for THF in water, 30 to 90% for acetonitrile in water. The mean efficiency reported in percent for the aforestated solvent/water mixtures is approximately 25% plus or minus 2%, whereas with known commercial scintillation cocktails, the percent efficiency varies from about 23% at 10% water content to as low as 2.2% at 50% water content; $^3H_2O$-spike of known activity was used each time.

Briefly, according to this invention, there is provided a iquid scintillation composition exhibiting a substantial uniform counting efficiency when mixed with specimens in a wide range of solvent/water mixtures. The liquid scintillation composition comprises a phosphorescent aromatic liquid capable of capturing energy from nuclear radiation and preferably comprises pseudocumene. The composition further comprises at least one fluor (fluorescent compound) and preferably comprises a mixture of diphenyloxazole (PPO) and bis(phenyloxazolyl) benzene (POPOP). The composition further comprises at least one low molecular weight alcohol, preferably, isopropyl alcohol. The composition further comprises a surfactant being a polyoxyalkylene unit with an attached straight chain alcohol or acid unit. Preferably, the surfactant comprises an ethoxylated or propoxylated fatty alcohol or fatty acid in which the moles of ethylene oxide or propylene oxide range from 5 to 25 and the length of the alkyl chain is between 6 and 20 carbon atoms.

The compositions according to this invention preferably comprise between about 50 to 90 parts by weight of the aromatic liquid, between about 10 and 35 parts by weight of the surfactant, between about 5 and 20 parts by weight of the low molecular weight alcohol and between about 0.1 and 5 parts by weight of the fluor or fluors, all parts based upon the entire composition wich equals 100 parts.

DESCRIPTION OF THE PREFERRED EMBODIMENTS

In the following examples the liquid scintillation cocktail composition was batched by mixing at room temperature in glass lined or stainless steel containers. The cocktails were then mixed with HPLC solvent/water mixtures, 3 parts (7.5 milliliters) by volume of cocktail with 1 part (2.5 milliliters) of solvent mixture. The mixture of cocktail and solvent was then observed for appearance which may fall into the categories of gel, two-phase, hazy, or clear liquid. The mixture was mixed with a $^3$H-spike (heavy water) in an amount of 100 microliters. The activity of the $^3$H-spike was known enabling the later calculation of counting efficiency. Standard techniques were used for counting the radioactivity of the spiked cocktail solvent mixture over an adequate length of time enabling a representative counting rate which could be compared with the known radiation rate thus permitting calculation of the percent efficiency of the scintillation cocktail mixture. The solvent mixtures studied were studied at water contents of 10, 30, 50, 70, and 90%. Generally the solvents studied were acetonitrile, tetrahydrofuran (THF), and isopropyl alcohol (IPA).

EXAMPLE I

A scintillation cocktail mixture was prepared according to the following batch:
Plurafac-A-46: 40 grams
Isopropyl alcohol: 30 milliliters
Pseudocumene: 130 milliliters
PPO: 1 gram
POPOP: 0.2 grams Plurafac-A-46 is a commercial surfactant manufactured by B.A.S.F. Wyandotte Company and is an oxyethylated straight chain alcohol.

The testing of mixtures of this cocktail with various solvent water mixtures as described above is reported in the following Table I.

TABLE I

| Solvent in H$_2$O | 10% | 30% | 50% | 70% | 90% |
|---|---|---|---|---|---|
| Acetonitrile | | | | | |
| Appearance | Two-Phase | Two-Phase | Clear | Clear | Clear |
| Efficiency | 12.89% | 19.92% | 25.24% | 24.89% | 24.12% |
| THF | | | | | |
| Appearance | Two-Phase | Two-Phase | Clear | Clear | Clear |
| Efficiency | 11.62% | 16.48% | 25.82% | 28.47% | 28.84% |
| IPA | | | | | |
| Appearance | Two-Phase | Two-Phase | Clear | Clear | Clear |
| Efficiency | 14.03% | 20.67% | 25.85% | 25.36% | 26.15% |

EXAMPLE II

A scintillation cocktail was prepared from the following batch:
Plurafac-A-46: 48 grams
Isopropyl alcohol: 28 milliliters
Pseudocumene: 124 milliliters
PPO: 1 gram
POPOP: 0.2 grams Testing as described above is reported in the following table, Table II.

TABLE II

| Solvent in H$_2$O | 10% | 30% | 50% | 70% | 90% |
|---|---|---|---|---|---|
| Acetonitrile | | | | | |
| Appearance | Two-Phase | Clear | Clear | Clear | Clear |
| Efficiency | 26.25% | 23.35% | 22.59% | 22.55% | 22.62% |
| THF | | | | | |
| Appearance | Two-Phase | Clear | Clear | Clear | Clear |
| Efficiency | 23.36% | 25.78% | 25.51% | 26.08% | 27.18% |
| IPA | | | | | |
| Appearance | Two-Phase | Clear | Clear | Clear | Clear |
| Efficiency | 24.99% | 24.23% | 23.95% | 23.29% | 24.37% |

EXAMPLE III

A scintillation cocktail mixture was prepared from the following batch:
Plurafac-A-46: 60 grams
Isopropyl alcohol: 30 milliliters
Pseudocumene: 130 milliliters
PPO: 1 gram
POPOP: 0.2 grams Testing of this cocktail composition was performed as described above and the results are set forth in the following table, Table III.

TABLE III

| Solvent in H$_2$O | 10% | 30% | 50% | 70% | 90% |
|---|---|---|---|---|---|
| Acetonitrile | | | | | |
| Appearance | Gel | Clear | Clear | Clear | Clear |
| Efficiency | 23.45% | 22.30% | 21.67% | 21.91% | 23.04% |
| THF | | | | | |
| Appearance | Gel | Two-Phase | Clear | Clear | Clear |
| Efficiency | 24.82% | 24.53% | 25.12% | 25.40% | 27.11% |
| IPA | | | | | |
| Appearance | Gel | Two-Phase | Clear | Clear | Clear |
| Efficiency | 21.55% | 22.30% | 22.35% | 23.03% | 21.74% |

Examples I, II, and III establish that a liquid scintillation cocktail according to this invention has almost uniform counting efficiency over a wide range of solvents, when the water content of the solvent/water mixture is between 30 and 90%. In those scintillation cocktail compositions having higher surfactant contents (Examples II and III) the counting efficiency was almost uniform over the range 10 to 90% solvent in water.

EXAMPLE IV

A scintillation cocktail composition was prepared substantially as described in the preceding example except that the surfactant comprises Siponic L7-90. Siponic L7-90 is a polyoxyethylene lauryl ether having 7 moles of oxyethylene.

The scintillation cocktail was tested as described above and the test results are set forth in the following table, Table IV.

TABLE IV

| Solvent in H$_2$O | 10% | 30% | 50% | 70% | 90% |
|---|---|---|---|---|---|
| Acetonitrile | | | | | |
| Appearance | Two-Phase | Hazy | Clear | Clear | Clear |
| Efficiency | 16.88% | 24.04% | 22.97% | 22.85% | 21.82% |

TABLE IV-continued

| Solvent in H$_2$O | 10% | 30% | 50% | 70% | 90% |
|---|---|---|---|---|---|
| | | THF | | | |
| Appearance | Two-Phase | Two-Phase | Hazy | Clear | Clear |
| Efficiency | 16.18% | 20.65% | 26.37% | 26.08% | 26.93% |
| | | IPA | | | |
| Appearance | Two-Phase | Hazy | Clear | Clear | Clear |
| Efficiency | 17.95% | 24.56% | 24.06% | 23.64% | 24.17% |

EXAMPLE V

A scintillation cocktail was prepared substantially as described with the preceding two examples, except that the surfactant comprised a 50-50 mixture of Plurafac-A-46 and Siponic L7-90. The cocktail was tested as described above and the results are set forth in the following Table V.

TABLE V

| Solvent in H$_2$O | 10% | 30% | 50% | 70% | 90% |
|---|---|---|---|---|---|
| | | Acetonitrile | | | |
| Appearance | Two-Phase | Hazy | Clear | Clear | Clear |
| Efficiency | 20.13% | 23.06% | 22.36% | 21.15% | 21.45% |
| | | THF | | | |
| Appearance | Two-Phase | Hazy | Clear | Clear | Clear |
| Efficiency | 19.10% | 25.62% | 25.98% | 25.05% | 26.30% |
| | | IPA | | | |
| Appearance | Two-Phase | Clear | Clear | Clear | Clear |
| Efficiency | 20.92% | 23.15% | 22.89% | 23.08% | 23.66% |

EXAMPLE VI

The scintillation cocktail of Example IV comprising Siponic L7-90 as the only surfactant was prepared and tested with additional solvents. The ratio of cocktail to solvent was 3:1 by volume and then the ratio was changed to 2:1 by volume and the test reconducted. The results of the testing with the 3:1 cocktail/solvent mix is set forth in the following Table VIA and the test results for the 2:1 ratio of cocktail/solvent mix is set forth in Table VIB.

Tables VIA and VIB when compared illustrate that the ratio of cocktail to solvent mix affects the results and that the 3:1 ratio is more satisfactory than the 2:1 ratio.

TABLE VIA

| Solvent in H$_2$O | 10% | 30% | 50% | 70% | 90% |
|---|---|---|---|---|---|
| | | Acetonitrile | | | |
| Efficiency | 25.78% | 25.60% | 23.83% | 23.03% | 23.11% |
| Appearance | Hazy | Hazy | Clear | Clear | Clear |
| | | THF | | | |
| Efficiency | 23.60% | 26.03% | 26.93% | 26.87% | 27.53% |
| Appearance | Two-Phase | Two-Phase | Clear | Clear | Clear |
| | | Methanol | | | |
| Efficiency | 24.85% | 25.24% | 24.90% | 24.69% | 23.37% |
| Appearance | Two-Phase | Hazy | Clear | Clear | Clear |
| | | IPA | | | |
| Efficiency | 24.59% | 25.07% | 24.18% | 24.02% | 24.05% |
| Appearance | Two-Phase | Clear | Clear | Clear | Clear |

TABLE VIB

| Solvent in H$_2$O | 10% | 30% | 50% | 70% | 90% |
|---|---|---|---|---|---|
| | | Acetonitrile | | | |
| Efficiency | 14.34% | 16.50% | 21.15% | 20.37% | 20.23% |
| Appearance | Two-Phase | Two-Phase | Hazy | Clear | Clear |
| | | THF | | | |
| Efficiency | 11.98% | 13.29% | 18.90% | 24.11% | 24.41% |
| Appearance | Two-Phase | Two-Phase | Two-Phase | Clear | Clear |
| | | Methanol | | | |
| Efficiency | 13.71% | 16.40% | 17.08% | 21.24% | 19.43% |
| Appearance | Two-Phase | Two-Phase | Two-Phase | Hazy | Clear |
| | | IPA | | | |
| Efficiency | 14.02% | 17.65% | 20.82% | 20.02% | 20.24% |
| Appearance | Two-Phase | Two-Phase | Clear | Clear | Clear |

EXAMPLE VIIA

A scintillation cocktail was prepared from the following batch:
Siponic L7-90: 20 grams
Isopropyl alcohol: 10 grams
PPO: 0.5 grams
POPOP: 0.1 grams
Xylene: 75 milliliters This cocktail when mixed was turbid. With a 4:1 ratio of cocktail to solvent, the counting efficiencies and appearance for 50% water solvent solution were determined and the results are as set forth in Table VIIA.

TABLE VIIA

| Solvent | Efficiency | Appearance |
|---|---|---|
| Acetonitrile | 17% | Two-Phase |
| THF | 19.3% | Two-Phase |
| Methanol | 25.2% | Two-Phase |
| IPA | 28.35% | Hazy |

EXAMPLE VIIB

A scintillation cocktail was prepared from a batch comprising:
Siponic L7-90: 25 grams
Isopropyl alcohol: 15 grams
PPO: 0.5 grams
POPOP: 0.1 grams
Xylene: 65 milliliters The cocktail mixed was clear. The cocktail was tested with solvent mixtures as was Example VIIA and the results are set forth in Table VIIB.

TABLE VIIB

| Solvent | Efficiency | Appearance |
|---|---|---|
| Acetonitrile | 19.9% | Clear |
| THF | 22.97% | Clear |
| Methanol | 21.44% | Clear |
| IPA | 21.6% | Clear/Turbid |

Comparing the data set forth in Tables VIIA and VIIB, it can been seen that by increasing the surfactant concentration, the clarity of the cocktail solvent mixture is increased; however, the counting efficiency is changed depending upon the particular solvent.

By way of comparison, two commercially available scintillation cocktails which have been proposed for use with HPLC solvents were tested. Set forth in Table CIA are the test results with the first commercial scintillation cocktail used in a 3:1 ratio by volume of cocktail to solvent/water mixture as indicated. The same commercial scintillation cocktail was tested in 2:1 ratio by volume of cocktail to solvent/water mixture and the test results are set forth in Table CIB. Likewise, a second commercial scintillation cocktail was tested in a similar manner and the results thereof are set forth in Tables CIIA and CIIB.

TABLE CIA

| (Commercial Cocktail A-3:1 Ratio) | | | | | |
|---|---|---|---|---|---|
| Solvent in $H_2O$ | 10% | 30% | 50% | 70% | 90% |
| Acetonitrile | | | | | |
| Efficiency | 24.52% | 24.04% | 15.51% | 22.92% | 23.29% |
| Appearance | Gel | Gel | Gel | Gel | Viscous |
| THF | | | | | |
| Efficiency | 22.38% | 25.43% | 10.52% | 22.98% | 21.84% |
| Appearance | Two-Phase | Gel | Viscous | Two-Phase | Clear Fluid |
| Methanol | | | | | |
| Efficiency | 25.62% | 27.73% | 5.99% | 22.93% | 23.02% |
| Appearance | Clear Fluid | Clear Fluid | Clear Fluid | Clear Fluid | Clear Fluid |
| Butanol | | | | | |
| Efficiency | 27.45% | 30.19% | 5.97% | 22.85% | 24.90% |
| Appearance | Clear Fluid | Clear Fluid | Clear Fluid | Clear Fluid | Clear Fluid |

TABLE CIB

| (Commercial Cocktail A-2:1 Ratio) | | | | | |
|---|---|---|---|---|---|
| Solvent in $H_2O$ | 10% | 30% | 50% | 70% | 90% |
| Acetonitrile | | | | | |
| Efficiency | 21.37% | 22.20% | 13.48% | 20.84% | 20.06% |
| Appearance | Gel | Gel | Gel | Gel | Gel |
| THF | | | | | |
| Efficiency | 21.70% | 23.18% | 7.75% | 20.30% | 19.93% |
| Appearance | Viscous | Gel | Viscous | Viscous | Clear Fluid |
| Methanol | | | | | |
| Efficiency | 23.61% | 25.54% | 4.48% | 19.84% | 19.64% |
| Appearance | Clear Fluid | Clear Fluid | Clear Fluid | Clear Fluid | Clear Fluid |
| Butanol | | | | | |
| Efficiency | 25.36% | 28.70% | 4.27% | 19.92% | 21.44% |
| Appearance | Clear Fluid | Clear Fluid | Clear Fluid | Clear Fluid | Clear Fluid |

TABLE CIIB

| (Commercial Cocktail B-3:1 Ratio) | | | | | |
|---|---|---|---|---|---|
| Solvent in $H_2O$ | 10% | 30% | 50% | 70% | 90% |
| Acetonitrile | | | | | |
| Efficiency | 18.68% | 20.16% | 8.05% | 20.62% | 20.12% |
| Appearance | Gel | Gel | Gel | Gel | Viscous |
| THF | | | | | |
| Efficiency | 20.04% | 22.68% | 4.39% | 19.67% | 20.08% |
| Appearance | Two-Phase | Gel | Two-Phase | Two-Phase | Viscous |
| Methanol | | | | | |
| Efficiency | 20.10% | 24.96% | 2.17% | 18.87% | 20.30% |
| Appearance | Clear Fluid | Clear Fluid | Clear Fluid | Clear Fluid | Clear Fluid |
| Butanol | | | | | |
| Efficiency | 20.54% | 26.89% | 1.87% | 18.54% | 0.05% |
| Appearance | Clear Fluid | Clear Fluid | Clear Fluid | Clear Fluid | Clear Fluid |

TABLE CIIA

| (Commercial Cocktail B-2:1 Ratio) | | | | | |
|---|---|---|---|---|---|
| Solvent in $H_2O$ | 10% | 30% | 50% | 70% | 90% |
| Acetonitrile | | | | | |
| Efficiency | 17.92% | 17.88% | 5.96% | 16.85% | 0.06% |
| Appearance | Gel | Gel | Gel | Gel | Gel |
| THF | | | | | |
| Efficiency | 17.22% | 19.00% | 0.05% | 17.02% | 17.07% |
| Appearance | Two-Phase | Gel | Gel | Two-Phase | Gel |
| Methanol | | | | | |
| Efficiency | 16.84% | 22.07% | 0.05% | 15.81% | 0.05% |
| Appearance | Clear Fluid | Clear | Clear Fluid | Clear Fluid | Clear Fluid |
| Butanol | | | | | |
| Efficiency | 17.55% | 0.06% | 1.18% | 14.85% | 18.42% |
| Appearance | Clear Fluid | Clear | Clear Fluid | Clear Fluid | Clear Fluid |

Review of the data in Tables CIA, CIB, CIIA, and CIIB shows that with the cocktails tested the counting efficiency dropped drastically for solvent/water mixtures comprising 50% solvent. This characteristic makes them unsuitable for gradient elution chromatography. The cocktails disclosed and claimed herein disclose no such drop in counting efficiency.

A scintillation cocktail was prepared in a manner similar to Example II except that Brij 35 surfactant was substituted for Plurafac-A-46. The Brij 35 surfactant comprises a polyethylene glycol lauryl ether having approximately 3 moles of oxyethylene. The composition was tested in the same manner as the cocktail of Example II and the results are set forth in Table CIII.

TABLE CIII

| Solvent in $H_2O$ | 10% | 30% | 50% | 70% | 90% |
|---|---|---|---|---|---|
| Acetonitrile | | | | | |
| Appearance | Two-Phase | Two-Phase | Two-Phase | Hazy Phase | Clear |
| Efficiency | 3.05% | 3.96% | 7.90% | 21.07% | 20.29% |
| THF | | | | | |
| Appearance | Two-Phase | Two-Phase | Two-Phase | Two-Phase | Clear |
| Efficiency | 3.08% | 4.11% | 8.17% | 20.44% | 23.75% |
| IPA | | | | | |
| Appearance | Two-Phase | Two-Phase | Two-Phase | Clear | Clear |
| Efficiency | 4.05% | 4.65% | 9.93% | 21.63% | 21.90% |

Comparing the data in Table CIII with the data in Table II or Table IV it becomes apparent that for the scintillation cocktail according to this invention to be effective, the surfactant should comprise sufficient oxyethlyene groups.

EXAMPLE VIIIA AND VIIIB

To further explore the ability to produce uniform results at different pH levels, the scintillation cocktail of Example I was retested with various solvent mixtures at different concentrations with the pH adjusted to either pH 7 or pH 4. The earlier described test procedure was modified to add a 0.05 M acetate buffer and the pH was adjusted with NaOH. The ratio of the cocktail to solvent mix was 3:1 (7.5 ml of cocktail to 2.5 ml of solvent mixture). The data on efficiency and appearance is set forth in Table VIIIA (pH 7) and Table VIIIB (pH 4).

TABLE VIIIA

| (pH 7) | | | | | |
|---|---|---|---|---|---|
| Solvent in $H_2O$ | 10% | 30% | 50% | 70% | 90% |
| Acetonitrile | | | | | |
| Appearance | Clear | Clear | Clear | Clear | Clear |

TABLE VIIIA-continued (pH 7)

| Solvent in $H_2O$ | 10% | 30% | 50% | 70% | 90% |
|---|---|---|---|---|---|
| Efficiency | Sl. Viscous 23.02% | 21.70% THF | 21.32% | 21.26% | 20.94% |
| Appearance | Clear | Clear | Clear | Clear | Clear |
| Efficiency | Sl. Viscous 24.35% | 24.97% Methanol | 25.82% | 26.41% | 29.03% |
| Appearance | Clear | Clear | Clear | Clear | Clear |
| Efficiency | Sl. Viscous 23.86% | 23.56% IPA | 22.57% | 22.14% | 21.07% |
| Appearance | Clear | Clear | Clear | Clear | Clear |
| Efficiency | Sl. Viscous 23.52% | 22.72% | 22.23% | 22.17% | 23.09% |

TABLE VIIIB (pH 4)

| Solvent in $H_2O$ | 10% | 30% | 50% | 70% | 90% |
|---|---|---|---|---|---|
| | Acetonitrile | | | | |
| Appearance | Clear | Clear | Clear | Clear | Clear |
| Efficiency | Sl. Viscous 23.13% | 21.61% THF | 21.19% | 20.84% | 21.19% |
| Appearance | Clear | Clear | Clear | Clear | Clear |
| Efficiency | Sl. Viscous 23.97% | 25.25% Methanol | 25.37% | 26.19% | 29.09% |
| Appearance | Clear | Clear | Clear | Clear | Clear |
| Efficiency | Sl. Viscous 23.85% | 23.79% IPA | 23.25% | 22.48% | 21.38% |
| Appearance | Clear | Clear | Clear | Clear | Clear |
| Efficiency | Sl. Viscous 23.10% | 22.87% | 21.98% | 22.55% | 22.93% |

By way of comparison, two commercial scintillation cocktails were tested in accordance with the procedures of Example VIII. The test data are set forth in the following tables wherein Table CIVA and CIVB contain the data for commercial cocktail C at the pH 7 and pH 4 levels respectively and Tables CVA and CVB contain the data for commercial cocktail D at the pH 7 and pH 4 levels respectively.

TABLE CIVA (Commercial Cocktail C - pH 7)

| Solvent in $H_2O$ | 10% | 30% | 50% | 70% | 90% |
|---|---|---|---|---|---|
| | Acetonitrile | | | | |
| Appearance | Two-Phase | Two-Phase | Two-Phase | Two-Phase | Two-Phase |
| Efficiency | 21.54% | 19.89% THF | 17.36% | 16.46% | 20.07% |
| Appearance | Clear | Clear | Clear | Clear | Clear |
| Efficiency | 22.77% | 23.76% Methanol | 24.40% | 25.97% | 28.01% |
| Appearance | Clear | Clear | Clear | Clear | Clear |
| Efficiency | 22.36% | 21.92% IPA | 21.59% | 21.58% | 20.23% |
| Appearance | Clear | Clear | Clear | Clear | Clear |
| Efficiency | 21.46% | 21.42% | 21.19% | 21.63% | 22.35% |

TABLE CIVB (Commercial Cocktail C - pH 4)

| Solvent in $H_2O$ | 10% | 30% | 50% | 70% | 90% |
|---|---|---|---|---|---|
| | Acetonitrile | | | | |
| Appearance | Clear | Ppt | Clear | Two-Phase | Two-Phase |
| Efficiency | 21.46% | 20.95% THF | 18.34% | 17.96% | 20.95% |
| Appearance | Two-Phase | Clear | Clear | Clear | Clear |
| Efficiency | 22.28% | 23.31% Methanol | 24.64% | 25.50% | 28.08% |
| Appearance | Clear | Clear | Clear | Clear | Clear |
| Efficiency | 22.19% | 21.71% IPA | 21.47% | 21.51% | 20.69% |
| Appearance | Clear | Clear | Clear | Clear | Clear |
| Efficiency | 21.11% | 21.34% | 20.91% | 21.49% | 22.33% |

TABLE CVA (Commercial Cocktail D - pH 7)

| Solvent in $H_2O$ | 10% | 30% | 50% | 70% | 90% |
|---|---|---|---|---|---|
| | Acetonitrile | | | | |
| Appearance | Ppt | Two-Phase | Two-Phase | Two-Phase | Ppt |
| Efficiency | 19.92% | 16.23% THF | 15.07% | 14.86% | 18.66% |
| Appearance | Clear | Clear | Clear | Clear | Clear |
| Efficiency | 20.95% | 21.59% Methanol | 22.80% | 24.27% | 26.76% |
| Appearance | Clear | Clear | Clear | Clear | Clear |
| Efficiency | 20.73% | 20.70% IPA | 20.38% | 19.50% | 18.93% |
| Appearance | Clear | Clear | Clear | Clear | Clear |
| Efficiency | 22.01% | 20.36% | 20.17% | 20.51% | 21.20% |

TABLE CVB (Commercial Cocktail D - pH 4)

| Solvent in $H_2O$ | 10% | 30% | 50% | 70% | 90% |
|---|---|---|---|---|---|
| | Acetonitrile | | | | |
| Appearance | Ppt | Two-Phase Ppt | Two-Phase | Two-Phase | Ppt |
| Efficiency | 19.17% | 17.14% THF | 15.99% | 14.49% | 19.36% |
| Appearance | Clear | Clear | Clear | Clear | Clear |
| Efficiency | 20.74% | 21.55% Methanol | 23.09% | 24.11% | 26.82% |
| Appearance | Clear | Clear | Clear | Clear | Clear |
| Efficiency | 19.58% | 21.17% IPA | 20.11% | 19.88% | 18.82% |
| Appearance | Clear | Clear | Clear | Clear | Clear |
| Efficiency | 18.93% | 19.85% | 20.28% | 19.93% | 20.58% |

Comparison of the data in Tables VIIIA and VIIIB with the data in Tables CIVA, CIVB, CVA, and CVB establishes that the cocktails according to this invention are superior.

The phosphorescent aromatic compounds capable of capturing energy from radiation from radio-tagged compositions are known in the art and include the following:

Benzene: $C_6H_6$
Toluene: $C_6H_5CH_3$
O-Xylene: $1,2-C_6H_4(CH_3)_2$
M-Xylene: $1,3-C_6H_4(CH_3)_2$
P-Xylene: $1,4-C_6H_4(CH_3)_2$
Pseudocumene: $1,2,4-C_6H_3(CH_3)_3$
Mesitylene: $1,3,5-C_6H_3(CH_3)_3$ The fluors (which serve to shift the wavelength of emitted light to that to which the photocells are most sensitive) are known in the art and include the following:

PPO: 2,5-diphenyloxazole
PBD: 2-Phenyl-5-(4-Biphenylyl)-1,3,4,-Oxadiazole
PTP: p-terphenyl
Bis-MSB: 1,4-bis-(o-methyl styryl) benzene
POPOP: 1,4-bis-2-(5-Phenyloxazolyl)-Benzene
Dimethyl POPOP: 1,4-bis-2-(4-Methyl-5 Phenyloxazolyl)-Benzene Low molecular weight alcohols are known in the art and include the following:

methyl alcohol
ethyl alcohol
n-propyl alcohol
Isopropyl alcohol
Normal and Isobutyl alcohol

Having thus described the invention with the detail and particularity required by the Patent Laws, what is desired protected by Letters Patent is set forth in the following claims.

We claim:

1. A liquid scintillation composition having a substantially uniform counting efficiency when mixed with specimens comprising radio-tagged compositions in a solvent/water mixture over a wide range of solvent/water ratios comprising:
   an aromatic liquid capable of capturing energy from radiation;
   at least one fluor compound;
   optionally one low molecular weight alcohol; and
   a surfactant consisting essentially of a oxyalkylated straight chain alcohol or acid.

2. A liquid scintillation composition according to claim 1 wherein the surfactant comprises an ethoxylated or propoxylated fatty alcohol or fatty acid in which the moles of ethylene oxide or propylene oxide range from 5 to 25 and the length of alkyl chain is between 6 and 20 carbon atoms.

3. A composition according to claim 1 or 2 wherein the aromatic liquid comprises about 50 to 90 parts by weight, the surfactants about 10 to 35 parts by weight; the low molecular weight alcohol between about 1 and 20 parts by weight and the fluorescent compounds between about 0.1 to 5 parts by weight, all parts based upon the entire composition equalling 100 parts.

4. A liquid scintillation composition consisting essentially of:
   a. about 50 to 90 parts by weight pseudocumene;
   b. about 0.1 to 5 parts by weight of a fluorescent compound comprising mixtures of PPO and POPOP;
   c. about 5 to 20 parts by weight of IPA; and
   d. about 10 to 35 parts by weight of an ethoxylated straight chain alcohol in which the moles of ethylene oxide range from 5 to 25 and the length of the alkyl chain is between 6 and 20 carbon atoms, all parts by weight based upon the entire composition equalling 100 parts.

* * * * *